United States Patent
Sobanski et al.

(10) Patent No.: US 11,668,199 B2
(45) Date of Patent: Jun. 6, 2023

(54) VANE ARC SEGMENT WITH RADIALLY PROJECTING FLANGES

(71) Applicant: RAYTHEON TECHNOLOGIES CORPORATION, Farmington, CT (US)

(72) Inventors: Jon E. Sobanski, Glastonbury, CT (US); Howard J. Liles, Newington, CT (US); Chang Gao, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/193,369

(22) Filed: Mar. 5, 2021

(65) Prior Publication Data

US 2022/0282628 A1 Sep. 8, 2022

(51) Int. Cl.
*F01D 9/00* (2006.01)
*F01D 9/04* (2006.01)
*F02C 3/04* (2006.01)

(52) U.S. Cl.
CPC ............... *F01D 9/041* (2013.01); *F02C 3/04* (2013.01); *F05D 2220/32* (2013.01); *F05D 2240/12* (2013.01); *F05D 2240/35* (2013.01); *F05D 2300/6033* (2013.01)

(58) Field of Classification Search
None
See application file for complete search history.

(56) References Cited

U.S. PATENT DOCUMENTS

| | | | |
|---|---|---|---|
| 4,552,509 A | 11/1985 | Schweikl et al. | |
| 6,425,738 B1* | 7/2002 | Shaw | F01D 9/041 415/209.2 |
| 10,072,516 B2 | 9/2018 | Carr et al. | |
| 2013/0189108 A1* | 7/2013 | Schlemmer | F01D 9/041 29/889.7 |
| 2016/0084096 A1* | 3/2016 | Carr | F02C 3/04 60/805 |
| 2016/0123163 A1* | 5/2016 | Freeman | F01D 9/042 415/200 |
| 2016/0123164 A1 | 5/2016 | Freeman et al. | |
| 2020/0232332 A1 | 7/2020 | Farrar et al. | |

FOREIGN PATENT DOCUMENTS

| | | |
|---|---|---|
| EP | 1908924 | 4/2008 |
| EP | 3121379 | 1/2017 |

OTHER PUBLICATIONS

European Search Report for European Patent Application No. 22160357.4 dated Jul. 27, 2022.

* cited by examiner

*Primary Examiner* — Edwin Kang (74) *Attorney, Agent, or Firm* — Carlson, Gaskey & Olds, P.C.

(57) ABSTRACT

A vane arc segment includes an airfoil fairing that has first and second platforms and an airfoil section. The platforms have first and second openings that open into the airfoil section. The platforms each define first and second circumferential mate faces, forward and aft sides, a gaspath side, a non-gaspath side. The first platform has a first flange that projects radially from the non-gaspath side aft of the first opening and a second flange that projects radially from the non-gaspath side forward of the first opening. The first and second flanges are exclusive flanges on the first platform. The second platform has a third flange that projects radially from the non-gaspath side aft of the second opening.

20 Claims, 5 Drawing Sheets

VANE ARC SEGMENT WITH RADIALLY PROJECTING FLANGES

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A vane arc segment according to an example of the present disclosure includes an airfoil fairing having first and second platforms and an airfoil section that extends there between. The first and second platforms have, respectively, first and second openings that open into the airfoil section. The first and second platforms each define first and second circumferential mate faces, forward and aft sides, a gaspath side, and a non-gaspath side. The first platform has a first flange that projects radially from the non-gaspath side aft of the first opening. The first flange extends in a first flange length-wise direction between the first and second circumferential mate faces, and a second flange projecting radially from the non-gaspath side forward of the first flange. The first and second flanges are exclusive flanges on the first platform. The second platform has a third flange that projects radially from the non-gaspath side aft of the second opening. The third flange extends in a third flange length-wise direction between the first and second circumferential mate faces.

In a further embodiment of any of the foregoing embodiments, the second flange extends in a second flange length-wise direction between the first circumferential mate face and the forward side.

A further embodiment of any of the foregoing embodiments includes a support block in contact with the non-gaspath side of the second platform forward of the second opening.

In a further embodiment of any of the foregoing embodiments, the third flange is an exclusive flange on the second platform.

In a further embodiment of any of the foregoing embodiments, the second platform further includes a fourth flange projecting radially from the non-gaspath side forward of the first opening.

In a further embodiment of any of the foregoing embodiments, the third and fourth flanges are exclusive flanges on the second platform.

In a further embodiment of any of the foregoing embodiments, the first flange and the third flange lie in a common plane.

In a further embodiment of any of the foregoing embodiments, each of the first, second, and third flanges are of uniform radial height.

In a further embodiment of any of the foregoing embodiments, the first flange is parallel to the aft side of the first platform.

In a further embodiment of any of the foregoing embodiments, the first flange in the first flange length-wise direction is longer than the second flange in the second flange length-wise direction.

In a further embodiment of any of the foregoing embodiments, the airfoil fairing is formed of a ceramic matrix composite.

A vane arc segment according to an example of the present disclosure includes an airfoil fairing that has first and second platforms and an airfoil section that extends there between. The first and second platforms have, respectively, first and second openings that open into the airfoil section. The first and second platforms each define first and second circumferential mate faces, forward and aft sides, a gaspath side, and a non-gaspath side. The first platform has a first flange that projects radially from the non-gaspath side aft of the first opening. The first flange extends in a first flange length-wise direction between the first and second circumferential mate faces, and a second flange that projects radially from the non-gaspath side forward of the first opening. The second flange extends in a second flange length-wise direction between the first circumferential mate face and the forward side. The first and second flanges are exclusive flanges on the first platform. The second platform has a third flange that projects radially from the non-gaspath side aft of the second opening. The third flange extends in a third flange length-wise direction between the first and second circumferential mate faces. Support hardware supports the airfoil fairing via the first, second, and third flanges. The airfoil fairing has a center of pressure and an aerodynamic load vector through the center of pressure that causes tangential, axial, and radial loads. The first flange transmitts the tangential and axial loads to the support hardware. The second flange transmitts the tangential loads to the support hardware, and the third flange transmits the tangential, axial, and radial loads to the support hardware.

In a further embodiment of any of the foregoing embodiments, the first flange and the third flange lie in a common plane, and each of the first, second, and third flanges are of uniform radial height.

In a further embodiment of any of the foregoing embodiments, the first flange in the first flange length-wise direction is longer than the second flange in the second flange length-wise direction.

In a further embodiment of any of the foregoing embodiments, the first flange is parallel to the aft side of the first platform.

A gas turbine engine according to an example of the present disclosure includes a compressor section, a combustor in fluid communication with the compressor section, and a turbine section in fluid communication with the combustor. The turbine section has van arc segments disposed about a central axis of the gas turbine engine. Each of the vane arc segments includes an airfoil fairing that has first and second platforms and an airfoil section extending there between. The first and second platforms have, respectively, first and second openings that open into the airfoil section. The first and second platforms each define first and second circumferential mate faces, forward and aft sides, a gaspath side, and a non-gaspath side. The first platform has a first flange that projects radially from the non-gaspath side aft of the first opening. The first flange extends in a first flange length-wise direction between the first and second circumferential mate faces, and a second flange projects radially from the non-gaspath side forward of the first opening. The second flange extends in a second flange length-wise direction between the first circumferential mate face and the forward side. The first and second flanges are exclusive flanges on the first platform. The second platform has a third flange that projects radially from the non-gaspath side aft of the second opening. The third flange extends in a third flange length-wise direction between the first and second circumferential mate faces.

In a further embodiment of any of the foregoing embodiments, the turbine section includes support hardware that supports the vane arc segment and interfaces with the first flange, the second flange, and the third flange.

In a further embodiment of any of the foregoing embodiments, each of the first, second, and third flanges are of uniform radial height.

In a further embodiment of any of the foregoing embodiments, the first flange is parallel to the aft side of the first platform.

In a further embodiment of any of the foregoing embodiments, the first flange in the first flange length-wise direction is longer than the second flange in the second flange length-wise direction

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
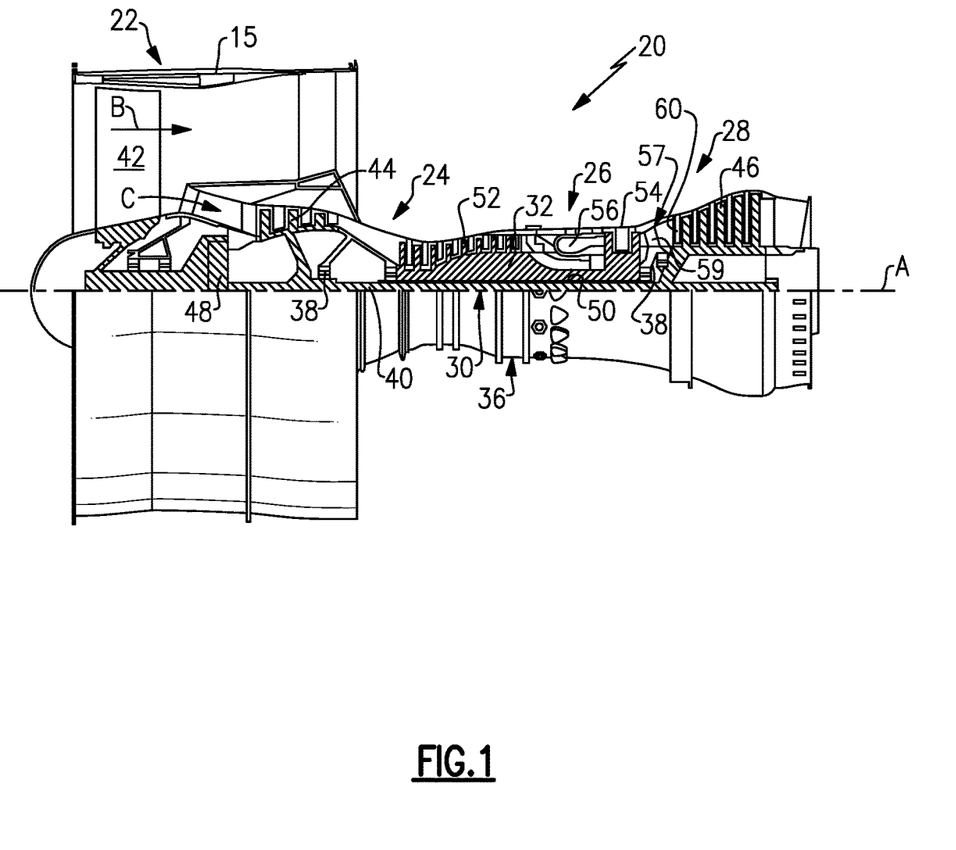
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{R})/(518.7° \text{R})]^{0.5}$. The "Low corrected fan tip speed" as disclosed herein according to one non-limiting embodiment is less than about 1150 ft/second (350.5 meters/second).

Figure 2:
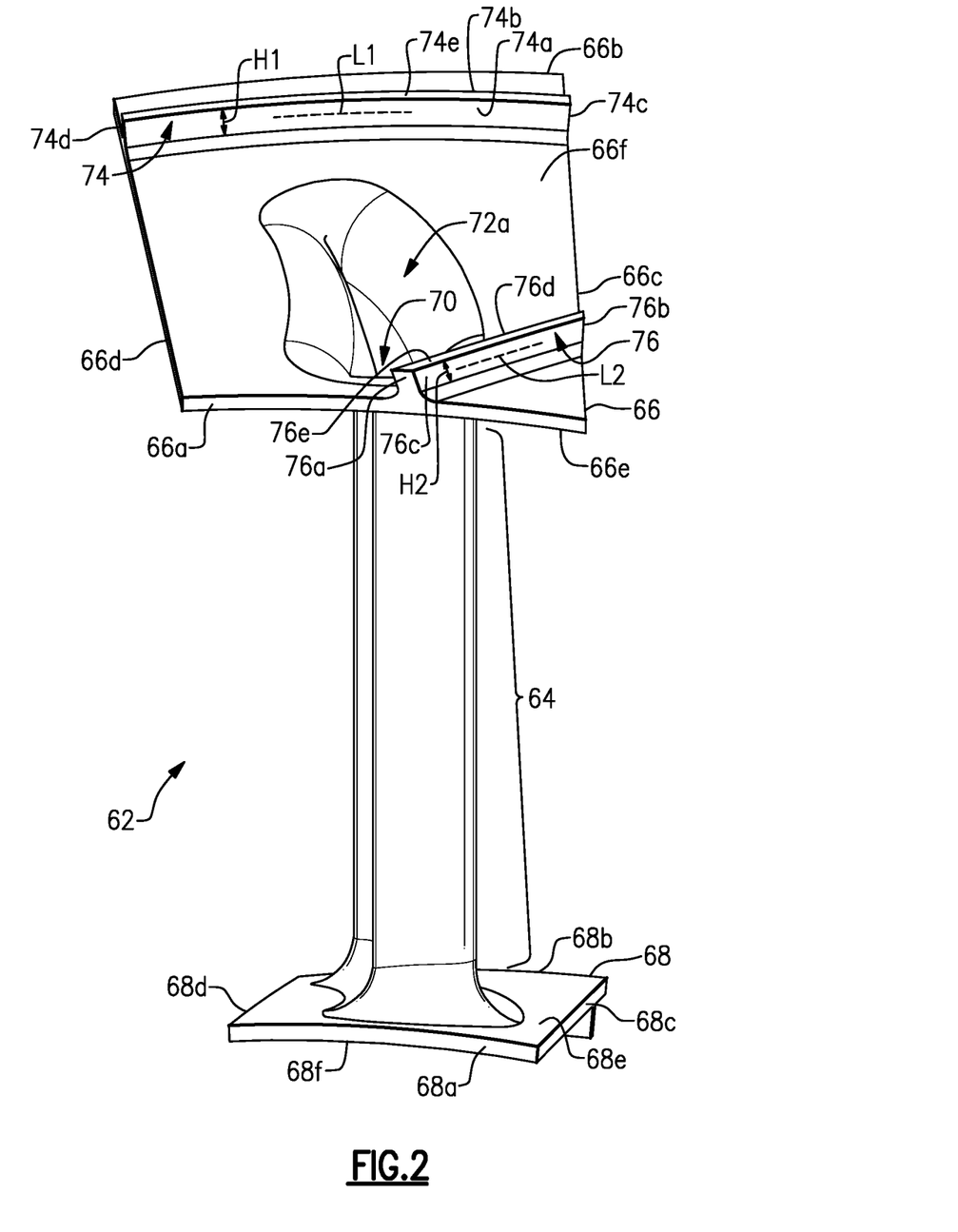
FIG. 2 illustrates an airfoil fairing.
Figure 3:
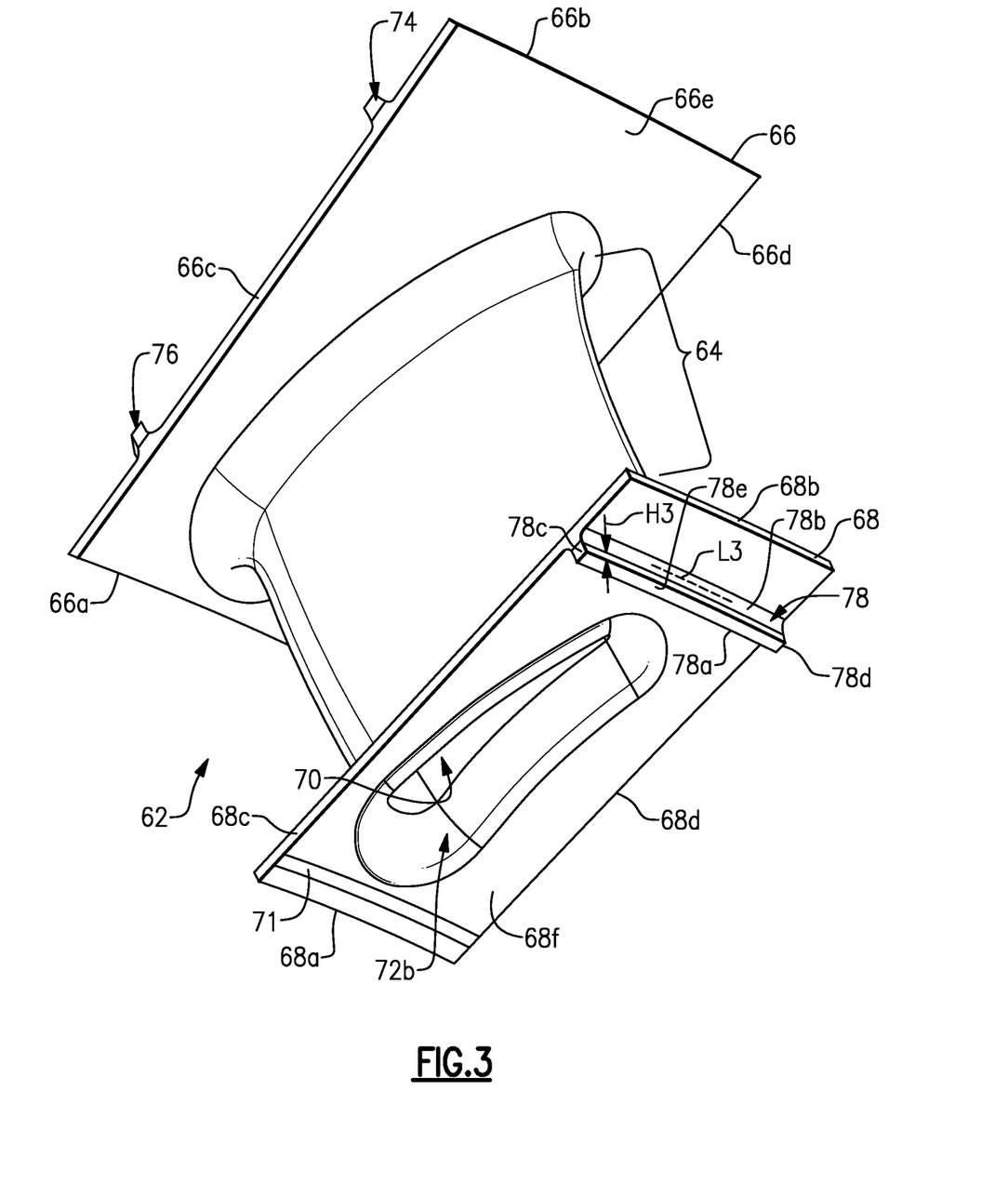
FIG. 3 illustrates another vie of the airfoil fairing of FIG. 2.

FIGS. 2 and 3 illustrate different angled views of portions of a vane arc segment from the turbine section 28 of the engine 20. A plurality of such vane arc segments is situated in a circumferential row about the engine central axis A. Although the vane arc segment is shown and described with reference to application in the turbine section 28, it is to be understood that the examples herein are also applicable to structural vanes in other sections of the engine 20.

The vane arc segment is comprised of an airfoil fairing 62. The airfoil fairing 62 includes several sections, including an airfoil section 64 and first and second platforms 66/68 between which the airfoil section 64 extends. The airfoil section 64 circumscribes a central cavity 70. The platforms 66/68 include respective openings 72a/72b that open into the central cavity 70. It is to be understood that although the illustrated example is s "singlet" with one airfoil section, the examples herein may also be applied to vane "doublets" that have two airfoil sections.

The airfoil fairing 62 is continuous in that the platforms 66/68 and airfoil section 64 constitute a unitary body. As an example, the airfoil fairings are formed of a ceramic matrix composite, an organic matrix composite (OMC), or a metal matrix composite (MMC). For instance, the ceramic matrix composite (CMC) is formed of ceramic fiber tows that are disposed in a ceramic matrix. The ceramic matrix composite may be, but is not limited to, a SiC/SiC ceramic matrix composite in which SiC fiber tows are disposed within a SiC matrix. Example organic matrix composites include, but are not limited to, glass fiber tows, carbon fiber tows, and/or aramid fiber tows disposed in a polymer matrix, such as epoxy. Example metal matrix composites include, but are not limited to, boron carbide fiber tows and/or alumina fiber tows disposed in a metal matrix, such as aluminum. A fiber tow is a bundle of filaments. As an example, a single tow may have several thousand filaments. The tows may be arranged in a fiber architecture, which refers to an ordered arrangement of the tows relative to one another, such as, but not limited to, a 2D woven ply or a 3D structure.

In the illustrated example, the first platform 66 is a radially outer platform and the second platform 68 is a radially inner platform. The first platform 66 defines forward and aft (axial) sides 66a/66b, first and second circumferential mate faces 66c/66d, a gaspath side 66e, and a non-gaspath side 66f. Likewise, the second platform 68 defines forward and aft (axial) sides 66a/66b, first and second circumferential mate faces 66c/66d, a gaspath side 66e, and a non-gaspath side 66f. Terms such as "inner" and "outer" used herein refer to location with respect to the central engine axis A, i.e., radially inner or radially outer. Moreover, the terminology "first" and "second" used herein is to differentiate that there are two architecturally distinct components or features. It is to be further understood that the terms "first" and "second" are interchangeable in that a first component or feature could alternatively be termed as the second component or feature, and vice versa.

The first platform 66 includes first and second flanges 74/76 that project radially from the non-gaspath side 66f. The first flange 74 is aft of the first opening 72a and forward of the aft side 66b, and the second flange 76 is forward of the first flange 74. The first flange 74 is elongated in a first flange length-wise direction L1 between the circumferential mate faces 66c/66d. That is, the first flange 74 generally extends in the circumferential direction (relative to the engine central axis A) such that a radial plane in which the first flange 74 lies intersects both mate faces 66c/66d. The first flange 74 defines forward and aft faces 74a/74b, terminal circumferential end faces 74c/74d, and a radial face 74e. In this example, the first flange 74 is of uniform radial height H1 and is substantially parallel to the aft side 66b of the first platform 66. In modified examples, the first flange 74 is non-parallel to the aft side 66b in order to adjust applied loads.

In this example, the second flange 76 is elongated in a second flange length-wise direction L2 between the circumferential mate face 66c and the forward side 66a of the first platform 66. That is, the second flange 76 is generally sloped relative to the forward side 66a of the first platform 66 such that a radial plane in which the second flange lies intersects the forward side 66a and the mate face 66c but does not intersect the aft side 66b or mate face 66d. The second flange 76 is generally shorter in length along its length-wise direction L2 than the first flange 74 is along its length-wise direction L1 (i.e., the first flange 74 is longer than the second flange 76). The second flange 76 defines a forward end face 76a, a circumferential end face 76b, a forward side face 76c, an aft side face 76d, and a radial face 76e. In this example, the second flange 76 is of uniform radial height H2, and the height H2 is equal to the height H1 of the first flange 74. The heights H1/H2 may alternatively be unequal. In one alternative example, the radial height H2 is non-uniform. For instance, the radial height H2 slopes from one terminal end of the flange 76 to the other terminal end in order to adjust applied loads. Additionally, in any of the above examples, the second flange 76 could alternatively be located to either the pressure or suction side of the opening 72a. For instance, the second flange 76 could extend from the mate face 66c or 66d.

The second platform 68 includes a third flange 78 that projects radially from the non-gaspath side 68f. The third flange 74 is aft of the second opening 72b. The third flange 78 is elongated in a third flange length-wise direction L3 between the circumferential mate faces 68c/68d. That is, the third flange 78 generally extends in the circumferential direction (relative to the engine central axis A) such that a radial plane in which the third flange 78 lies intersects both mate faces 68c/68d. In this example, the third flange 78 and the first flange 74 also lie in a common plane PL (see FIG. 4). The third flange 78 defines forward and aft faces 78a/78b, terminal circumferential end faces 78c/78d, and a radial face 78e. In this example, the first flange 74 is of uniform radial height H3, and the height H3 is equal to each of heights and H2. The height H3 may alternatively be unequal to one or both of heights H1 and H2.

Figure 4:
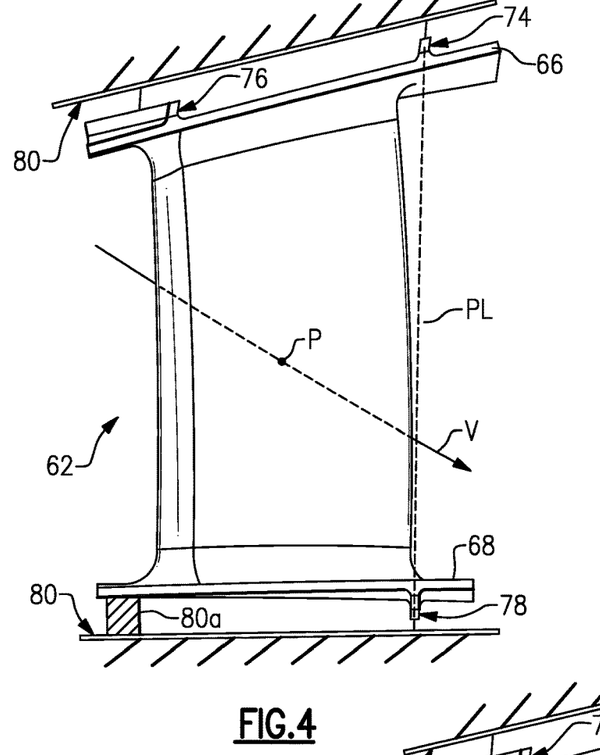
FIG. 4 illustrates an airfoil fairing and support hardware.

As shown in FIG. 4, the airfoil fairing 62 is supported by support hardware, generally indicated at 80, that has attachment features that interface with the flanges 74/76/78. For example, the attachment features are channels that correspond in geometry to the flanges 74/76/78 to receive the flanges 74/76/78 therein. The support hardware 80 is not particularly limited, but may include a spar, a support platform, case structures, or the like.

In general, support schemes for mounting structural vane segments formed of CMCs, OMCs, and MMCs are challenging due to lower material stress limits in comparison to high strength superalloys used for some traditional vane segments. For instance, traditional support schemes that utilize hooks or a series of rails can concentrate stresses, create aerodynamic loads, and/or create thermal stresses which may exceed material limits of fiber-reinforced composites. Therefore, even though fiber-reinforced composites may have many potential benefits, such benefits cannot be realized without a suitable support scheme that is also manufacturable. In this regard, the flanges 74/76/78 serve as exclusive support features to facilitate a low-stress mounting scheme. The flanges 74/76/78 may also serve to stiffen the platforms 66/68.

During operation of the engine 20 combustion gases flow across the airfoil section 64 and gaspath sides 66e/68e of the platforms 64/66. The flow causes aerodynamic loads on the airfoil fairing 62. The aerodynamic loads may be represented by an aerodynamic load vector V through a center of pressure P of the airfoil fairing 62. The vector V is defined by the aerodynamics of the engine 20, including the vane count, mass flow rate, and the turning of the hot gas stream. The turning is a function of the inlet flow angle and the stage reaction, and is independent of the vane camber and/or the chord, for example. The direction of the vector V is defined herein as being orthogonal to the tangent of the aerodynamic turning path of the airfoil fairing 62, and is located at the center of pressure P. Those of ordinary skill in the art will know where this location is and how to determine the vector V, as they will need to determine during the design process.

Figure 5A:
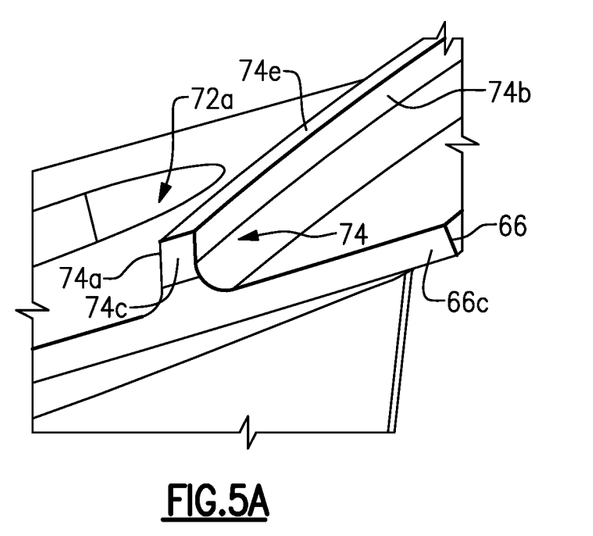
FIG. 5A illustrates the load-bearing of a first flange of a platform of an airfoil fairing.
Figure 5B:
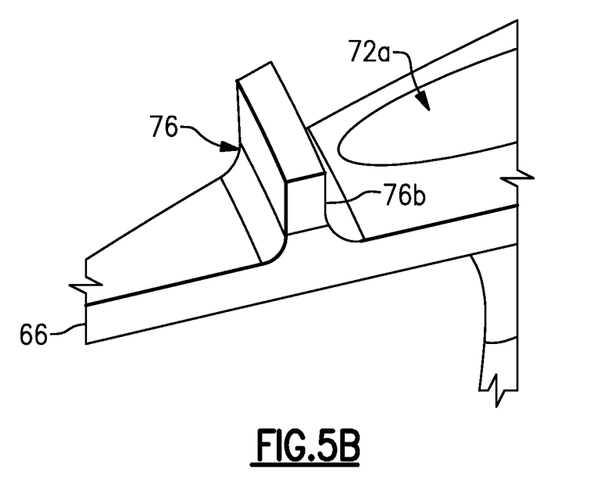
FIG. 5B illustrates the load-bearing of a second flange of a platform of an airfoil fairing.
Figure 5C:
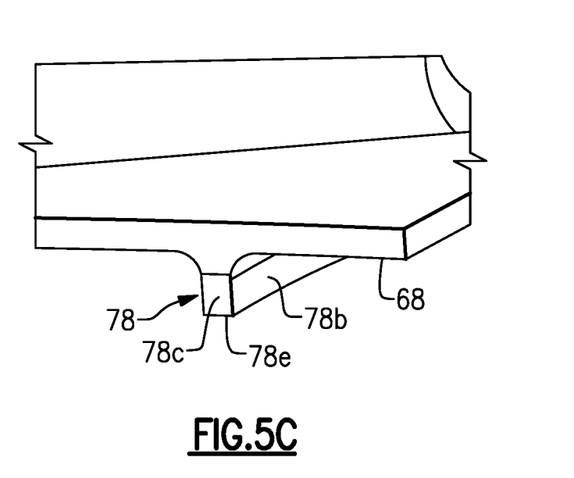
FIG. 5C illustrates the load-bearing of a third flange of a platform of an airfoil fairing.

The aerodynamic loads are transmitted through the airfoil fairing 62 to the support hardware 80. In this regard, the flanges 74/76/78 serve as primary load-bearing features to transmit such loads to the support hardware 80. For example, referring to FIGS. 5A, 5B, and 5C, the first flange 74 transmits tangential loads through the circumferential end face 74c and axial loads through the aft face 74b. In this example, the faces 74a/74d/74e are substantially zero-load bearing. The second flange 76 transmits tangential loads through circumferential end face 76b. The faces 76a/76c/76d/76e are substantially zero-load bearing. The third flange 78 transmits tangential loads through circumferential end face 78c, axial loads through aft face 78b, and radial loads through radial face 78e. The faces 78a/78d are substantially zero-load bearing. As shown in FIG. 4, the support hardware 80 may additionally include a load block 80a that serves to further transmit radial loads. In that regard, the platform 68 may have a bearing surface 71 (FIG. 3) that is in contact with the load block 80a.

Figure 6:
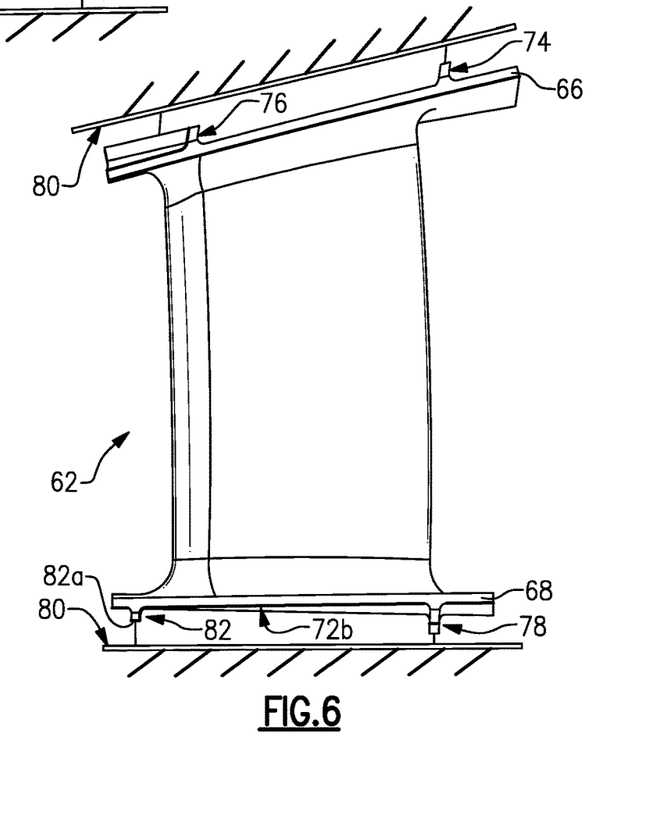
FIG. 6 illustrates another example of an airfoil fairing with an additional flange.

Alternatively, as shown in FIG. 6, rather than the load block 80a, the platform 68 of the airfoil fairing 62 may include a fourth flange 82. The fourth flange 82 is forward of the second opening 72b and includes a radial face 82a that transmits radial loads. The other faces of the fourth flange 82 are substantially zero-load bearing.

The flanges 74/76/78 (and optionally the fourth flange 82) are the exclusive flanges of the platforms 66/68. Moreover, the flanges 74/76/78/82 are of relatively simple geometry in comparison to hook geometries that are traditionally used in metallic airfoils. In this regard, the flanges 74/76/78/82 are conducive to the use of the fiber-reinforced composite for the airfoil fairing 62. Such composites have manufacturing limitations in that they cannot be used to form complex-geometry mounting structures that are used for metallic airfoils because the fiber tows cannot bend to the necessary shape and/or the fiber-reinforced composite is not tolerant of geometries that create stresses. However, by having only the flanges 74/76/78 (and optionally flange 82) and configuring the flanges 74/76/78/82 as simple radial projections, the flanges 74/76/78/82 are able to bear the aerodynamic loads, yet maintain manufacturability through integration into the platforms 66/68. As an example, fiber tows in the platforms 66/68 are turned up to form the flanges 74/76/78/82. Moreover, as the flanges 74/76/78/82 are radial projections, they are also conducive to manufacturing of the airfoil fairing 62 in a die, such as a die that holds the fiber tows as a pre-form for densification with the matrix. For instance, curvatures and hook features would cause die-lock with the die halves. The flanges 74/76/7/828, however, can readily be retracted from the die halves without die-locking.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane arc segment comprising:
  an airfoil fairing having first and second platforms and an airfoil section extending there between, the first and second platforms having, respectively, first and second openings that open into the airfoil section,
  the first and second platforms each defining first and second circumferential mate faces, forward and aft sides, a gaspath side, a non-gaspath side,
  the first platform having:
    a first flange projecting radially from the non-gaspath side of the first platform aft of the first opening, the first flange extending in a first flange length-wise direction between the first and second circumferential mate faces of the first platform, and
    a second flange projecting radially from the non-gaspath side of the first platform forward of the first flange, the first and second flanges being the only flanges on the first platform, and
  the second platform having:
    a third flange projecting radially from the non-gaspath side of the second platform aft of the second opening, the third flange extending in a third flange length-wise direction between the first and second circumferential mate faces of the second platform, and
  wherein the second flange extends in a second flange length-wise direction from the first circumferential mate face to the forward side of the first platform.

2. The vane arc segment as recited in claim 1, further comprising a support block in contact with the non-gaspath side of the second platform forward of the second opening.

3. The vane arc segment as recited in claim 1, wherein the third flange is the only flange on the second platform.

4. The vane arc segment as recited in claim 1, wherein the second platform further includes a fourth flange projecting radially from the non-gaspath side forward of the second opening.

5. The vane arc segment as recited in claim 4, wherein the third and fourth flanges are the only flanges on the second platform.

6. The vane arc segment as recited in claim 1, wherein the first flange and the third flange lie in a common plane.

7. The vane arc segment as recited in claim 1, wherein each of the first, second, and third flanges are of equal radial height.

8. The vane arc segment as recited in claim 1, wherein the first flange is parallel to the aft side of the first platform.

9. The vane arc segment as recited in claim 1, wherein the first flange in the first flange length-wise direction is longer than the second flange in the second flange length-wise direction.

10. The vane arc segment as recited in claim 1, wherein the airfoil fairing is formed of a ceramic matrix composite.

11. The vane arc segment as recited in claim 1, wherein each of the first, second, and third flanges have an end-to-end length and are of uniform radial height over the end-to-end length.

12. A vane arc segment comprising:
an airfoil fairing having first and second platforms and an airfoil section extending there between, the first and second platforms having, respectively, first and second openings that open into the airfoil section,
the first and second platforms each defining first and second circumferential mate faces, forward and aft sides, a gaspath side, a non-gaspath side,
the first platform having:
a first flange projecting radially from the non-gaspath side of the first platform aft of the first opening, the first flange extending in a first flange length-wise direction between the first and second circumferential mate faces of the first platform, and
a second flange projecting radially from the non-gaspath side of the first platform forward of the first opening, the second flange extending in a second flange length- wise direction from the first circumferential mate face to the forward side of the first platform, the first and second flanges being the only flanges on the first platform, and
the second platform having:
a third flange projecting radially from the non-gaspath side of the second platform aft of the second opening, the third flange extending in a third flange length-wise direction between the first and second circumferential mate faces of the second platform;
the airfoil fairing having a center of pressure and an aerodynamic load vector through the center of pressure that causes tangential, axial, and radial loads, the first flange transmitting the tangential and axial loads, the second flange transmitting the tangential loads, and the third flange transmitting the tangential, axial, and radial loads.

13. The vane arc segment as recited in claim 12, wherein the first flange and the third flange lie in a common plane, and each of the first, second, and third flanges are of equal radial height.

14. The vane arc segment as recited in claim 13, wherein the first flange in the first flange length-wise direction is longer than the second flange in the second flange length-wise direction.

15. The vane arc segment as recited in claim 14, wherein the first flange is parallel to the aft side of the first platform.

16. The vane arc segment as recited in claim 12, further comprising support hardware supporting the airfoil fairing via the first, second, and third flanges, wherein the support hardware is selected from the group consisting of channels that correspond in geometry to the first, second, and third flanges, a spar, a support platform, and an engine case.

17. A gas turbine engine comprising:
a compressor section;
a combustor in fluid communication with the compressor section; and
a turbine section in fluid communication with the combustor, the turbine section having vane arc segments disposed about a central axis of the gas turbine engine, each of the vane arc segments includes:
an airfoil fairing having first and second platforms and an airfoil section extending there between, the first and second platforms having, respectively, first and second openings that open into the airfoil section,
the first and second platforms each defining first and second circumferential mate faces, forward and aft sides, a gaspath side, a non-gaspath side,
the first platform having:
a first flange projecting radially from the non-gaspath side of the first platform aft of the first opening, the first flange extending in a first flange length-wise direction between the first and second circumferential mate faces of the first platform, and
a second flange projecting radially from the non-gaspath side of the first platform forward of the first opening, the second flange extending in a second flange length- wise direction from the first circumferential mate face to the forward side of the first platform, the first and second flanges being the only flanges on the first platform, and
the second platform having:
a third flange projecting radially from the non-gaspath side of the second platform aft of the second opening, the third flange extending in a third flange length-wise direction between the first and second circumferential mate faces of the second platform.

18. The gas turbine engine as recited in claim 17, wherein the turbine section includes support hardware that supports the vane arc segment and interfaces with the first flange, the second flange, and the third flange, and wherein the support hardware is selected from the group consisting of channels that correspond in geometry to the first, second, and third flanges, a spar, a support platform, and an engine case.

19. The gas turbine engine as recited in claim 17, wherein each of the first, second, and third flanges are of equal radial height, and the first flange is parallel to the aft side of the first platform.

20. The gas turbine engine as recited in claim 17, wherein the first flange in the first flange length-wise direction is longer than the second flange in the second flange length-wise direction.

* * * * *